United States Patent [19]

Chang et al.

[11] Patent Number: 5,665,824

[45] Date of Patent: Sep. 9, 1997

[54] ALKALINE AND WATER SOLUBLE ARTICLES AND METHOD OF MAKING SAME

[75] Inventors: Peter L Chang; Carl D. Ray, both of Terre Haute, Ind.

[73] Assignee: Tredegar Industries, Inc., Richmond, Va.

[21] Appl. No.: 381,543

[22] Filed: Jan. 31, 1995

[51] Int. Cl.$^6$ .................................................. C08L 71/02
[52] U.S. Cl. ........................ 525/185; 525/186; 525/187; 525/57
[58] Field of Search .................................. 525/185, 186, 525/187, 57

[56] References Cited

U.S. PATENT DOCUMENTS

| | | | |
|---|---|---|---|
| 3,852,913 | 12/1974 | Clendinning et al. | 47/37 |
| 5,147,712 | 9/1992 | Miyahara et al. | 428/224 |
| 5,258,422 | 11/1993 | Chang et al. | 523/124 |
| 5,362,532 | 11/1994 | Famili et al. | 428/36.6 |
| 5,429,874 | 7/1995 | VanPutte | 428/522 |

OTHER PUBLICATIONS

Hawley's Condensed Chemical Dictionary, 12th Ed. (Ed. R.J. Lewis, Sr), pp. 85, 127, 288, 783, 784, 1113 and 1213.

*Primary Examiner*—Helen Lee
*Attorney, Agent, or Firm*—Emch, Schaffer, Schaub & Porcello

[57] ABSTRACT

The present invention relates to degradable thermoplastic compositions comprising at least one polycaprolactone property modifier blended with at least one water soluble polymer and/or at least one alkaline soluble polymer. Articles produced with this composition have a long and useful life under dry or aqueous conditions. When such articles are exposed to a hot aqueous alkaline solution, the composition dissolves and is readily disposed.

1 Claim, 1 Drawing Sheet

ALKALINE AND WATER SOLUBLE ARTICLES AND METHOD OF MAKING SAME

TECHNICAL FIELD

The present invention relates to disposable films and articles. The invention further relates to alkaline soluble and water soluble thermoplastic films and molded products which are insoluble in cold water and very soluble in hot alkaline solutions.

BACKGROUND OF THE INVENTION

Currently, many industries produce vast quantities of plastic material waste and are seeking ways to reduce waste. Much of this waste is in the form of plastic materials made from polyethylene and polypropylene materials. In particular, the packaging and health care industries are looking for a safe and effective way to dispose of medical packaging, infectious medical waste and medical disposable products.

Consequently, many industries are seeking new materials to replace polyethylene and/or polypropylene plastic materials. This is a special concern to the packaging and health care industries, for instance, since such industries are currently producing more and more types of disposable type products. One material considered for replacement of polyethylene and/or polypropylene materials is polyvinyl alcohol (PVOH).

There is a great deal of interest in using the water soluble polyvinyl alcohol polymers as components in many person care and medical care products such as films, sheets, nonwoven materials, woven fabrics, foams, injected molded products and thermal formed products. However, materials made of these water soluble polymers suffer from a lack of toughness, tear resistance and heat seal strength.

Various medical disposable products, such as disclosed in U.S. Pat. Nos. 5,181,966, 5,181,967 and 5,207,387, are made from externally plasticized hot water soluble polyvinyl alcohol compositions. These medical products are disposed of by being placed in a special high temperature washing machine that breaks down the polyvinyl alcohol compositions. During the process, the medical disposable materials are reduced to a fluid-like soapy liquid which then enters the sewer system. The 90° C. plus high temperature of the water sterilizes the waste water before the waste water is sent along with other sewage to a water treatment facility. The breakdown products entering the sewer system in the washing machine are biodegradable and meet health standards.

However, a problem arises with such hot water soluble films and/or disposable products. These films and products often do not have good cold water resistance. In order for a product to be useful, the product must be cold water resistant for at least about six to eight hours while being in direct contact with cold water. The currently available commercial hot water soluble films are made of a solution cast or melt extruded polyvinyl alcohol film which does not have adequate cold water resistance for the time requirements needed in the health care industry. These products do not retain their integrity after about five minutes exposure to cold waters.

Attempts to develop hot water soluble PVOH films included using thermoplastic PVOH resin blends consisting of a fully hydrolyzed PVOH resin or resin blend, an external plasticizer such as glycerol and other additives. In order to work with the film, however, the film extrusion temperatures were very close to the thermal decomposition temperature of the PVOH resin. While the external plasticizer is added to reduce the extrusion temperature and improve the flexibility, the external plasticizer causes severe smoking and lensing problems during film extrusion. The resulting hot water soluble PVOH films were very brittle with low tear strength and low elongation and lack of cold water resistance. Further, these hot water soluble PVOH resins had many undesirable cross-linked polymer gels.

In addition, the water soluble films containing externally plasticized polyvinyl alcohol are not suitable for use in many disposable products. The external plasticizer additives migrate out of the polyvinyl alcohol materials. For instance, disposable products such as diapers, underpads and sanitary napkins generally comprise three major components: a topsheet, an absorbent core and a backsheet. The topsheet is usually a nonwoven fabric or a perforated film, while the backsheet is usually an embossed film or a coated nonwoven fabric. The disposable products are packaged in close arrangement in a plastic bag or box. The backsheet and topsheet are in direct contact with the absorbent core layer. If the backsheets and/or topsheets contain polyvinyl alcohol with external plasticizers, then the low molecular weight plasticizer additive in the plasticized polyvinyl alcohol films,are absorbed by the absorbent core layer. By losing most or all of the plasticizer additive, the polyvinyl alcohol film becomes brittle, weak and non-useful.

Another material considered for replacement of polyethylene and/or polypropylene material is an alkaline soluble thermoplastic resin. These alkaline soluble thermoplastic polymers are of environmental interest because of their solubility in alkaline solutions and their compostability due to eventual disintegration upon prolonged exposure to moisture, notwithstanding the fact that the films are relatively hydrophobic. However, alkaline soluble polymers are very brittle and-weak. Films and nonwovens made from these alkaline soluble polymers are also quite sticky and tend to block in roll form. In addition, stability and aesthetic properties of these material are very poor. Further, injected molded products made of alkaline soluble polymers are also very brittle. Various products containing alkaline soluble materials are described in the U.S. Pat. Nos. 4,870,148, 5,063,272, 5,149,333 and 5,346,955. These materials comprise(meth)acrylic ester/(meth)acrylic acid copolymers and modified polyolefins. However, it has been found that the polymeric web compositions made of these materials do not have the desired improved properties and the alkaline solubilities of these web is very poor. In addition, many of these products contain property modifiers which are not soluble in alkaline solutions.

It is an object of the present invention to provide composite films and articles useful for making biodegradable disposable products. The compositions provided by this invention have excellent long-term shelf life under "dry conditions", including product storage and end use periods. According to the present invention, the compositions can ultimately be dissolved or broken down in the presence of a hot alkaline solution, such as hot water with a strong detergent commonly used in a washing machine.

Another object of the present invention is to provide liquid impervious thermoplastic films which are especially suitable for use in absorbent articles such as surgical gowns, drapes, sanitary napkins, panty liners, diapers and the like, which are adapted for absorbing various bodily fluids.

Another object of the present invention is to provide liquid impervious thermoplastic degradable articles which are especially suitable for use as various medical disposable products such as biohazard bags, hospital laundry bags, liner bags, suture bags, Mayo stand covers, table covers, drape sheets, utility drapes, laparotomy sheets, CRS wraps, underpads, bed linens, drapes, gowns, needle counters, prep trays, operation room basins, bowls, sponges, utensils, petri dishes, pipettes, specimen containers, medicine cups, glasses and the like which come into contact with various bodily fluids.

It is another object of the present invention to provide a degradable molded product and thermoformed product useful for packaging applications such as for packaging insecticides, medicines, chemicals, dyes, pigments and industrial additives and similar materials.

DISCLOSURE OF THE INVENTION

One aspect of the present invention relates to a degradable thermoplastic composition comprising at least one thermoplastic water soluble polymer and at least one alkaline soluble material.

A multi-layer structure having at least one water soluble core layer and at least one alkaline skin or laminating layer is disclosed in a co-pending patent application, Ser. No. 08/381,544 filed Jan. 31, 1995 which is assigned to the same assignee as herein and the entire contents of which are expressly incorporated by reference herein. The core layer comprises at least one water soluble polymer such as polyvinyl alcohol or polyethylene oxide homopolymers, copolymers and blends thereof. The core layer is coated or laminated on at least one side with an outer or skin layer comprising at least one alkaline soluble polymer or copolymer such as an alkaline soluble material including, for example, ethyl acrylate/methacrylic acid copolymers and meth acrylate/methacrylic acid copolymers. Under the dry product storage and end use periods, the alkaline soluble coating layer effectively protects the thermoplastic water soluble core layer from breaking down due to exposure to cold water. Therefore, under both dry or aqueous conditions, the degradable films have excellent long-term life.

By varying the composition of the multi-layer structures, the specific performance properties, including required shelf life and end use life and the desired post-useful life degradation, are achieved. In particular, cold water resistant, alkaline soluble three-layer coextruded blown or cast film comprising alkaline soluble resins as the skin layers and a cold water soluble polyvinyl alcohol resin as the core layer are insoluble in cold water and very soluble in an alkaline solution. The two alkaline soluble coating layers provide the required cold water resistance and the polyvinyl alcohol core layer provides the required physical strength and cold water solubility.

Various alkaline soluble resins are very soluble in an alcohol such as ethyl alcohol and cold water PVOH films are not very soluble in alcohols. Therefore, the alcohol-based coating resin solutions can be made by dissolving an alkaline soluble resin in alcohol and then applying to a core PVOH layer.

Also, a cold water resistant, alkaline soluble film or sheet can be produced by extrusion coating or solution coating the alkaline soluble coating layers onto a cold water soluble film or sheet. The cold water resistant, alkaline soluble injection molded products can be made by dipping or spraying of a cold water soluble PVOH injection molded part with an alcohol based alkaline soluble solution.

The cold water resistant, alkaline soluble injected molded parts can also be made by a co-injection molding process in which a solid paint coating (for example the alkaline soluble coating resin) is delivered in pellet form to a heated mold, to the barrel of a dual injection system. A core plastic-material, (for example the PVOH resin) then enters and fills the mold.

Successful production of cold water resistant alkaline soluble multi-layer coextruded film products depends on several criteria including layer polymer selection processing conditions and equipment and multi-layer composition of the product itself. The processing conditions include the residents time in the coextrusion blown film system to prevent thermal degradation and/or crosslinking of the PVOH resin (which results in gels). It has been found that internally plasticized PVOH resins reduce any smoking or lensing problems. Further, use of internal plasticized materials prevents migration of any plasticizer into the alkaline soluble layers, which migration softens the coating layers.

The present invention provides an improvement over the coextruded films of the co-pending application. The present invention overcomes any potential problems due to interfacial melt instability caused by differences in the melt flow rate between the PVOH resin and coating resin. The present invention also overcomes any potential blocking and inadequate heat seal strength concerns due to migration of any external plasticizer into coating layers and delamination at the interface between the layers.

The present invention provides a film which can be used alone or as a further coating layer. The present invention provides films with improved properties such as good flexibility, tear strength, good heat seal strength and presents no blocking problems. The films of the present invention are suitable for use as components in personal and medical care products.

The present invention provides an alkaline soluble single layer film with adequate film properties, good cold water resistance and good alkaline solubility so that the expensive and time consuming coextrusion processes can be avoided. The single layer alkaline soluble film can be produced using conventional film extruded systems.

The present invention provides an alkaline soluble injection molded product with good flexibility, good cold water resistance and good alkaline solubility so that expensive solution coating and co-injection processes can be avoided.

The present invention further provides an alkaline soluble nonwoven web with good physical properties, good cold water resistance and alkaline solubility without any sticking problems. The present invention also provides alkaline soluble thermal formed products and foams which also has good physical properties, good cold water resistance and good alkaline solubility.

These alkaline soluble single layer films, nonwoven, injection molded, thermal formed products and/or forms are suitable for use in personal and medical care products and also are suitable for use in many industrial, packaging and agricultural applications. According to the present invention, a property modifier is incorporated into or blended into the alkaline soluble materials to form products having improved properties, including good flexibility, good tear strength, increased elongations, good heat seal strengths, good dimensional stability, good cold water resistance, reduced tackiness and the like.

The preferred property modifiers are biodegradable, have broad miscibility or mechanical compatibility with many polymers. In particular, the property modifiers improve polymer processing (including an extrusion processing aid and/or a mold release additive) are excellent pigment and filler disbursement aids, have low and sharp melting points and outstanding adhesion to a broad spectrum of substances, and further are non-toxic. The property modifiers degrade environmentally and are hospitable to microbial growth in such environments as sea water.

In particular, useful property modifiers include polycaprolactones and in particular low molecular Weight polycaprolactone polymers with a molecular weight in the range from about 350 to 4,000. Union Carbide makes Tone™ Polymers, for example P-767 and P-787 which are homopolymers of epsilon-caprolactone (PCL), a seven member ring compound. The Tone™ Polymers have a low and sharp melting temperature of about 60° C. Their melt indices are 30 and 4 respectively, tested at 190° C. under a 2.16 Kg load. At room temperature, the polyols are in the form of a liquid or waxy solid. In addition, the property modifier can be blended with water soluble materials, including for example PVOH polymers.

The films of the present invention are suitable in absorbent articles or for forming thermoplastic degradable three-dimensional molded products. After use of the film or product, the product is exposed to an alkaline based aqueous solution, wherein the alkaline soluble material and the water soluble material quickly soften and dissolve in the presence of hot water and high pH conditions. In various embodiments, mechanical agitation which occurs during various degradation processes further quickens the breakdown of the product.

In certain embodiments, it is optional, but advantageous to provide low molecular weight wax additives such as fatty amides useful as slip and anti-block additives which aid in lowering the coefficient of friction of the composition. Optionally, the degradable compositions can also include other components such as heat stabilizers, biodegradable polymers, biodegradable organic additives, inorganic additives, anti-blocking agents, anti-static agents, slip agents, pigments and other desired components which do not affect the degradability of the thermoplastic composition of the present invention.

BEST MODE OF CARRYING OUT THE INVENTION

Figure 1:
FIG. 1 is a cross-sectional view of a multi-layer film structure of the present invention.

According to the present invention, the degradable thermoplastic composition comprises at least one water soluble homopolymer, copolymer or blends thereof and at least one alkaline soluble material. Other ingredients that can also be used in the composition include heat stabilizers, biodegradable polymers, biodegradable organic additives, inorganic additives, anti-blocking agents, anti-static agents, slip agents, pigments and the like.

Water soluble polymers.

Internally plasticized polyvinyl alcohol (PVA or PVOH) polymers are especially useful as the water soluble resins in the degradable composition of the present invention. Polyvinyl alcohol homopolymers, copolymers and blends thereof are highly crystalline materials and have a high glass transition temperature.

Polyvinyl alcohol is a synthetic, water soluble hydroxy polymer which is produced by the hydrolysis of polyvinyl acetate. The degree of the polymerization, the hydrolysis, the molecular weight, and the degree of crystallization have pronounced effects on the solubility, water sensitivity, tensile strengths, and other physical properties of the polyvinyl alcohol material. For instance, fully hydrolyzed polyvinyl alcohol resins are soluble only in hot to boiling water, while partially hydrolyzed polyvinyl alcohol resins are soluble at room temperature.

Polyvinyl alcohol decomposes below its softening temperature. The gradual discoloration of polyvinyl alcohol starts at above 100° C. and darkens rapidly above 130° C. The thermal decomposition of polyvinyl alcohol begins at about 200° C. The melting temperature of polyvinyl alcohol ranges from between 200° C. for partially hydrolyzed polyvinyl alcohol to about 220°–267° C. for fully hydrolyzed polyvinyl alcohol. For the thermoplastic processing of polyvinyl alcohol, the softening temperature must be below the composition temperature of polyvinyl alcohol. According to one aspect of the present invention, internally plasticized polyvinyl alcohol is used in order to lower the softening temperature below the decomposition temperature. Polyvinyl alcohol is internally plasticized through the use of comonomers, grafting or post-reactions. In addition, copolymers of vinyl alcohol and poly(alkyleneoxy)acrylates are disclosed in U.S. Pat. No. 4,618,648 and assigned to Air Products and Chemicals Inc. of Allentown, Pa.

Two useful internally plasticized polyvinyl alcohol copolymer are Hoechst/Celanese Mowiol™ GE 4-86 and GE 5-97 resins. The melt indices of Mowiol™ GE 4-86 and GE 5-97 are about 20 and 1.5 grams/10 min., respectively, tested at 190° C. and 2.16 kg. The degree of hydrolysis (saponification) of the Mowiol™ GE 4-86 and GE 5-97 are about 86 and 97 mole percent, respectively.

Any melt flow inconsistencies of a polyvinyl alcohol can be reduced to a desirable level by blending the polyvinyl alcohol with a partially hydrolyzed polyvinyl alcohol resin having a higher viscosity and a higher molecular weight. For example, the weight average molecular weight (Mw) of the Mowiol™ GE 4-86 is 62,000 g/mol, while the molecular weight of the hydrolyzed Mowiol™ polyvinyl alcohol ranges from about 14,000 up to about 175,000 g/mol.

The more useful internally plasticized polyvinyl alcohol polymers are produced by Nippon Gohsei and are known as Ecomaty™ AX resins (AX-50, 300 and 2000) which are melt extrudable, cold water soluble resins. The AX-50 has a melt temperature of about 199° C., crystallization temperature of about 178° C. and a glass transition temperature of about 48° C. The Melt Flow Index (MFI) at 210° C. and 2.16 kg is about 0.5 g/10 min. The apparent melt viscosity at 210° C. is about 2,600. The AX-300 has a melt temperature of about 180° C., crystallization temperature of about 160° C. and glass transition temperature of about 51° C. The MFI is about 2.9 and the apparent melt viscosity is about 1,500. The AX-2000 has a melt temperature of about 199° C., crystallization temperature of about 178° C., glass transition temperature of about 48° C. The MFI is about 19.4 and the apparent melt viscosity is about 5,500.

Nippon Gohsei's Ecomaty™ AX-300N is a newly developed hot water soluble version of Ecomaty™ AX-300 resin. Another polyvinyl alcohol resin is Poval™ PV505 (or CP-1000) from Kuraray which is a melt extrudable cold water soluble resin having a melt index of 2 g/10 min. at 190° C. and 2.16 kg.

Other water soluble resins.

The cold water soluble resins can include polyethylene oxide resins or a blend of two polyethylene oxide resins. For example, polyethylene oxide based resins are cold water soluble, oxidatively degradable, nonionic, high molecular weight from about 100,000 to about 8 million, thermoplastic polymers. Commercially available polyethylene oxide resins include Union Carbides' Polyox™ water soluble resins (WSR). Other polyethylene oxide resins include Meisei Chemical's Alkox™ and Seitetsu Kagaku's polyethylene oxide resins.

Alkaline soluble or dispersible polymers.

According to the present invention, it is to be understood that when the terminology "alkaline soluble" is used, that this term also contemplates the use of "alkaline dispersible" polymers and that these polymers are generally insoluble in water at about pH 7 or lower.

The alkaline soluble resins are thermoplastic resins and can be processed by melt extrusion processes such as blown film, cast film, coextrusion, extrusion coating, melt blown, injection molding processes and the like.

Useful alkaline soluble resins are copolymers of ethyl acrylate and methacrylic acid, or copolymers of methyl acrylate and methacrylic acid or styrene-modified terpolymers. The alkaline soluble resins can be dissolved in an alcohol-based solvent such as ethyl alcohol up to about 30 percent by weight. The alcohol-based solvent is more environmentally sound than use of many common solvents such as methyl ethylkeytone (MEK), N-N-dimethylforamide (DMF) and tetrahydrofuran (THF).

It has been found that in certain embodiments, the Belland G series alkaline soluble acrylic resins, which are three component resins comprising a soft acrylate/acrylic copolymer resin, a hard terpolymer and a blending resin are useful. Suitable water insoluble thermoplastic polymers include alkaline soluble resins or acid soluble resins such as those supplied by Belland Inc. of Andover, Mass. and disclosed in U.S. Pat. Nos. 4,870,148 and 5,346,955. For example, one suitable alkaline soluble resin is Belland's G30AN10LB resin which comprises about 63% by weight of a soft ethyl acrylatel/methacrylic acid (commercially known as GBC2600 flake), about 27%, by weight of a hard stryrene modified terpolymer (commercially known as GBC2600 flake) and about 10%, by weight, of an olefinic polymer blending agent. The Belland G30AN10LB resin is not soluble in cold water at pH 7, but is very soluble in alkaline solution and in alcohols.

Property modifiers.

Various thermoplastic polymers can be used in the blend of the present invention in order to modify the physical, thermal and melt blown properties of both the alkaline soluble resin and the water soluble resin. These thermoplastic polymers, designated as property modifiers, include polycaprolactone polymers, Union Carbide's Tone™ Polyols (caprolactone-based multifunctional polyols), ethylene methyl acrylate (EMA or EMAC), thermoplastic copolyester elastomers, thermoplastic polyurethane elastomers, DuPont's Bynel™ CXA resin, Firestone's Stereon™ 840A styrenic resin, and Shells Kraton™ styrenic resins.

Polycaprolactone resins are especially useful in blending with water soluble polyvinyl alcohol resins. Polycaprolactone resins have a low and sharp melting point of about 60° C. Useful polycaprolactone products include Union Carbide's Tone™ Polymers which are biodegradable and miscible or mechanically compatible with many other plastics. Tone™ Polymers P-787 and P-767 are homopolymers of epsilon-caprolactone (PCL), a seven member ring compound. They have a low and sharp melting temperature of 60° C.

Other components.

In addition to the above mentioned components, the degradable compositions of the present invention may contain other components which include, but are not limited to, heat stabilizers, flame retardants, pigments, anti-blocking agents, anti-static agents, slip agents, mold release agents, inorganic fillers and the like. Typical inorganic fillers are oxides of titanium, aluminum, silicone, magnesium and the like. Typical anti-blocking agents are silica or talc or other powdered materials. Typical anti-static agents include ethoxylated amines and quaternary amine salts. Typical slip agents include those commonly derived from amides of fatty acids.

Many film products are produced on a high speed machine, therefore high slip properties of films as they are processed is required. The films of the present invention can include such optional ingredients such as fatty amides useful as slip and anti-block additives. Fatty amides improve the slip characteristics of the polymer films by lowering the coefficient of friction. In certain embodiments, the amide is dispersed into the molten resin generally at levels of about 100–5,000 ppm. As the mixture solidifies, the waxy amide becomes incompatible with the resin and migrates to the surface, thus decreasing the coefficient of friction.

A typical alkaline soluble resin can contain from about 0 to about 0.1 percent, by weight, of a slip agent and from about 0 to about 0.6 percent, by weight, of an anti-blocking additive, based on the weight of the resin polymer. In certain embodiments, diatomaceous silica is an effective anti-blocking additive in films and sheets and is present at levels of about 0.05 to about 0.5 percent, by weight, based on the weight of the polymer.

In certain embodiments, preferred white pigments, including mixture of rutile and anatase titanium dioxides ($TiO_2$). Since the anatase $TiO_2$, a photodegradable additive, can be used as an accelerant, as well as a white pigment in the degradable composition, can range from about 3 to about 8 percent, by weight, based on the weight of the base polymer.

Processing of compositions.

The degradable compositions of the present invention can be processed to produce films, sheets, molded products and thermoformed products made of at least one water soluble polymer, at least one alkaline soluble polymer and at least one polycaprolactone property modifier. In certain embodiments, polycaprolactone can be dry blended with the alkaline soluble material and water soluble materials.

In other embodiments, alkaline soluble films are made from an alkaline soluble thermoplastic resin comprising a soft compound such as ethyl acrylate/methacrylic acid copolymer, a hard component such as an alkaline soluble styrene-modified terpolymer, and a property modifier such as polycaprolactone and, in preferred embodiments, an anti-block additive. The ratio of soft component to hard component can range from about 2.0:1 to 2.5:1. polycaprolactone can range from about 10 to about 40% by weight and the anti-block additive can be present at about 1 to 3% by weight anti-block additive.

In other embodiments, a multi-layer laminate can be made, wherein at least one layer comprises an alkaline soluble material comprising a soft polymer component, a hard component and a polycaprolactone property modifier.

In certain embodiments, multi-ply materials can be made using a lamination technology, wherein a film of the polycaprolactone-modified alkaline soluble material is laminated to a film of water soluble material, or wherein a film of alkaline soluble material is laminated to a film of polycaprolactone-modified alkaline soluble material.

In one embodiment, a polycaprolactone-modified alkaline soluble thin polymer coating layer is applied or extruded onto the top and/or bottom surfaces of a polycaprolactone-modified polyvinyl alcohol resin material. The thin alkaline soluble coating provides cold water resistance to the polyvinyl alcohol based film. The thin surface coating dissolves rapidly or disperses in a hot alkaline solution. It is contemplated that these disposal methods include the use of hospital laundry washing machines for disposal of medical plastic disposable products.

In certain embodiments, it is preferred to use the degradable compositions of the present invention to make embossed thermoplastic multi-layer films having fine patterns and a soft feel and to reduce gloss and improve the appearance of the film. One process involves a chill roll cast, direct embossing process, wherein there is direct extrusion casting of the multi-layer film and embossing of the multi-layer film between the nip of a chilled, steel embossing roll and a rubber backup roll.

The patterns on the steel embossing roll can be a random mat pattern, fine square pattern, diamond pattern, deep pattern and the like. The patterns on the screen roll can be varied by using different screen patterns.

Another process involves using a chill roll cast and a reheating embossing process, wherein there is direct cast extrusion of the multi-layer film onto a chilled steel roll. The multi-layer film is reheated, preferably using an infrared or hot air oven, and the multi-layer film is embossed between the nip of a steel embossed roll and a rubber backup roll.

Still another process involves using a blown film reheating embossing process, wherein the multi-layer film is extruded and blown and the blown film is reheated, preferably in an infrared or hot air oven, and embossed between the nip of a steel embossed roll and a rubber roll.

Still another process involves using cast multi-layer film using a vacuum embossing process, wherein there is direct extrusion of the film onto a rotating screen roll and the film is embossed with vacuum pressure.

In certain embodiments, it is desirable to perforate the films. One process involves a vacuum perforating process, wherein the cast multi-layer film is directed extruded onto a rotating screen roll and the molten multi-layer film is perforated with vacuum pressure by pulling portions of the film into perforations on the screen. Another process involves a hot needle perforating process, wherein a blown or cast multi-layer film is perforated using a hot needle process.

Another perforation process involves compression perforating, wherein a blown or cast multi-layer film is compressed between two metal engraved rolls to form perforations.

The compositions of the present invention can also be used to produce oriented multi-layer films in the machine direction or alternatively biaxially oriented multi-layer films. Oriented multi-layer films are useful in many packaging applications. For example, machine oriented multi-layer films can be used as adhesive tape films in many disposable applications. Also, the multi-layer films can be compression roll oriented to produce machine direction oriented films which then can be further oriented in a tentering orientation or in a transverse direction. It is also within the scope of the present invention to surface treat, for example, with corona discharge or print and laminate the disposable films.

EXAMPLE I

Preparation of Resin Blends

Comparative Examples

Several of Belland's three-component G30 resins were compounded on a 34-mm Leistritz's counter-rotating twin screw extruder. These G30 resins contain 10% by weight of original blending agent, or 10% or 20% by weight of a new blending agent A61 or another new blending agent A62. No significant improvement on film properties such as tear strengths, elongations, etc. were made using the new blending agents. These unknown, reactive blending agents were not alkaline soluble materials.

Example 1

Some alkaline soluble film samples were made from dry blends of Belland's G30AN10LB three-component resin with 10% to 30% by weight of polycaprolactone (Union Carbide's Tone™ Polymer P-787).

Example 2

Alkaline soluble film samples were made from three-component compounded resins which contain a soft alkaline soluble thermoplastic resin [ethyl acrylate/methylacrylic acid EA/MAA copolymers] component (Belland's GBC2600), a hard alkaline soluble powdery styrene modified terpolymer component (Belland's SBC2518), 10% to about 20% by weight of polycaprolactone (Union Carbide's Tone™ P-787 Polymer) and 2% by weight of an anti-block additive. The ratio of soft component to hard component was 2.33 to 1. Additional 5 to 20% by weight of PCL P-787 was dry blended with these three-component resins to achieve a desirable level of PCL-787 in the range of about 20% to about 40% by weight.

The melt indices of these PCL P-787 modified three-component alkaline soluble resins were 7, 20, and 55, tested at 190, 210 and 230° C., respectively, under 2.16 Kg load. These melt indices indicate that by varying the melt temperature, a single resin can be used in many different melt extrusion processes.

Example 3

Alkaline soluble film samples, injection molded samples and nonwoven samples were made from two three-component resins which contain a soft component GBC2600, a hard component SBC2518, 10% or 30% by weight of PCL P-787, and 2% by weight of an anti-block additive. The ratio of soft component to hard component was about 2 to 1 in order to improve the flexibility and tear strengths. These 10% and 30% PCL P-787 resins were dry blended to obtain a three-component resin containing 20% PCL P-787. Again, additional PCL P-787 was dry blended with these new three-component resin to achieve a desirable level of PCL P-787 in the range of about 20% to about 40% by weight.

Example 4

Water soluble PVOH film samples were made from dry blended resins of Ecomaty™ AX-300 resin with 10, 15 or 25% by weight of PCL P-787. The melt indices of AX-2000, AX-300, and AX-50 PVOH resins are 19.7, 2.9, and 0.5 gram/10 min., respectively, tested at 210° C. under a 2.16 Kg load. In certain embodiments, two of these AX PVOH resins can be dry blended to achieve a desirable melt index in the range of about 2 to about 8 grams/10 min. for a blown film process.

Example 5

Nippon Gohsei's hot water soluble Ecomaty™ AX-300N resin was modified by incorporating a Tone™ Polymer resin used to make various hot water soluble personal care products and medical disposable products.

EXAMPLE II

Preparation of Single Layer Films

Example 6

Single layer cast film samples were made from dry blended resins of a three-component alkaline soluble resin or Ecomaty™ AX-300 PVOH resin with PCL P-787. These cast film samples were prepared on a Killion cast film system (250 mm cast die, 32 mm 24:1 L/D extruder). To test the heat seal strengths, a PCL-787 modified alkaline soluble film was heat sealed with a PCL P-787 modified PVOH film.

The PCL P-787 containing alkaline soluble acrylic films had many improved film properties such as tear strengths, elongations, flexibility, cold water resistance and heat seal strengths.

TABLE 1

Elongations and Tear Strengths of Various Cast Film Samples

| Resin Blend (in weight percent) | Elongation, % MD/TD | Tear Strengths, grams/micron MD/TD |
|---|---|---|
| 100% G30AN10LB (10% original blending agent) | 231/191 | 0.80/2.10 |
| 90% G30AN10LB/10% PCL P-787 | 224/262 | 0.88/1.17 |
| 70% G30AN10LB/30% P-787 | 314/362 | 0.92/1.31 |
| 60% G30AN10LB/40% P-787 | 266/358 | 1.14/1.14 |
| 90% G30AN10LB/10% CXA E-374 | 258/256 | 0.60/2.80 |
| 100% G30AN10A61 (10% blending agent A61) | 195/7 | 0.16/0.26 |
| 100% G30AN20A61 (20% blending agent A61) | 193/11 | 0.36/0.60 |
| 90% G30AN10A61/10% Stereon ™ 840A | 181/58 | 0.43/0.87 |
| 100% G30AN10A62 (10% blending agent A62) | 159/14 | 0.45/0.53 |
| 100% G30AN20A62 (20% blending agent A62) | 220/40 | 0.43/1.05 |
| 90% G30AN10A62/10% Stereon ™ 840A | 207/78 | 0.82/2.13 |
| Blend #1 (60% GBC2600, 30% SBC2518, 10% P-787) | 112/36 | 0.67/1.01 |
| Blend #2 (50% GBC2600, 30% SBC2518, 20% P-787) | 48/18 | 0.72/0.86 |
| 100% AX-300PVOH | 175/29 | 0.85/1.49 |
| 90% AX-300/10% PCL P-787 | 197/203 | 1.13/2.83 |
| 75% AX-300/25% PCL P-787 | 245/191 | 0.88/7.31 |
| 90% AX-300 /10% CXA E-374 | 180/111 | 0.96/2.20 |

MD = Machine Direction, TD = Transverse Direction

The alkaline soluble acrylic films containing up to 40% by weight of PCL P-787 were insoluble in cold water but they were completely soluble or dispersed in a hot alkaline solution. The pH value of the 2% sodium carbonate solution was about 11 to 12. The solution temperature was kept either at 70° C. or at 80° C.

In the hot alkaline solution, the PCL P-787 containing alkaline soluble films softened quickly and dispersed into small pieces which looked like an egg-drop soup like solution within five minutes. The alkaline solution became a cloudy solution after the film was completely dispersed or dissolved in less than 8 to 10 minutes. The dissolved or dispersed PCL did not precipitate out from the alkaline solution after the solution was cooled down to room temperature.

Example 7

Small water pouches (150 mm×100 mm) were made from the single-layer PCL P-787 modified alkaline soluble film using an impulse heat sealer. These PCL modified alkaline soluble film had excellent cold water resistance. Water did not leak out from these water pouches after many weeks, On the other hand, the water pouches made of Belland's G30AN10LB resin did not hold water for more than one or two days.

EXAMPLE III

Preparation of Five-Layer Coextruded Films

Example 8

Brampton Engineering's 150 mm diameter, five-layer Streamlined Coextrusion Die (SCD) was used for the low residence time production of five-layer coextrusion blown films using the Tone™ Polymer modified resins. The five-layer coextruded blown film structures were B+/A+/A/A+/B+. Ecomaty™ AX-300 PVOH resin (A) and PCL P-787 modified AX-300 resin (A+) were used in the three middle layers (i.e. layers A and A+). The Tone™ Polymer modified three-component alkaline soluble resin (B+) was used on the two coating layers (i.e. layer B+).

The film thickness was targeted for 0.04 mm (1.5 mil) and the flat width of the tubing was 508 mm. The layer ratio were targeted for 25%/15%/20%/15%/25%. The PCL P-787 loading in PVOH layers and alkaline soluble coating layers were 15% and 30%, respectively. The extruder for the coating layers were run at the maximum speed of 128 rpm. The resulting coextruded blown film had very good heat seal strengths improved tear strengths, improved flexibility and improved cold water resistance. The inside film surfaces were blocked and the outside surface was not blocked. In certain embodiments, a higher loading of an anti\blocking additive is desired to adequately cool the bubble cooling. The coextruded blown film containing Belland's blending agent had slight lensing problem.

Example 9

All acrylic coextruded blown films were made using the die described in Example 8 by using the PCL modified alkaline soluble resin in the core layers instead of using the PVOH resin. The five-layer structure was B+/B+/B+/B+/B+. The PCL loading was 30% by weight in each layer. All acrylic blown films had good film properties including excellent heat seal strengths improved tear strengths, improved elongations, improved flexibility and improved cold water resistance.

The single-layer alkaline soluble films can be made from a PCL modified alkaline soluble resin without using PVOH resin. The all acrylic films can be run on any conventional film lines. Therefore, expensive PVOH resin and expensive coextrusion film process can be avoided.

EXAMPLE IV

Preparation of Injection Molded Products

Example 10

Tone™ Polymers were incorporated into an alkaline soluble resin blend to enhance physical properties of injection molded articles. The improved properties include strength, toughness and heat distortion temperature.

Example 11

Tone™ Polymers were incorporated into water soluble PVOH resin blends and water soluble PVOH resin blend to enhance physical properties and cold water resistance.

Example 12

Nippon Gohsei's Ecomaty™ AX-2000 injection molding grade, cold water soluble PVOH resin processed well on injection molding trials. The cold water resistance of an injection molded articles made of a PCL rich blend such as 50–60% PCL and 50–40% PVOH was acceptable.

EXAMPLE V

Preparation of Nonwovens

Comparative Example

A PEBAX™ modified alkaline soluble resin GBC2620 was made into a nonwoven web by means of a spun bond process. Air Products' Vinex™ 2019 externally plasticized PVOH resin was made into a nonwoven web on a 152 mm wide melt blown pilot line. A fluorocarbon melt additive such as 3M's Scotchban™ Protector FX-1801 melt additive repellent was added.

Example 13

The PCL modified alkaline soluble resins and water soluble PVOH resins where made into nonwovens by common processes such as melt blown and spun bond, etc.

EXAMPLE VI

Preparation of Fibers

The PCL modified alkaline soluble resins and water soluble PVOH resins were made into fibers and woven webs by common processes and tested on Ampacet's Hills fiber machine.

EXAMPLE VII

Preparation of Thermoformed Products

The PCL modified alkaline soluble resins and water soluble PVOH resins were made into sheets and thermoformed articles by common processes and tested on a thermoforming machine.

EXAMPLE VIII

Preparation of Foamed Products

The PCL modified alkaline soluble resins and water soluble PVOH resins were made into foamed products by common processes and tested on Killion using a foaming agent.

EXAMPLE IX

Coextruded Water Soluble Film

A Five-layer coextrusion film was formed on a 150 mm Streamlined Coextrusion Die.

Film Thickness and Width: 0.04 (1.50 mil), 508 mm Tubing

Bag Size: 508 mm×610 mm H

Color: Translucent Teal

| Layers<br>Extruders<br>Blends | Inside/<br>B /<br>Structures (Resins)<br>PE /<br>25% / | Core<br>C D E<br>PE PE PE<br>15%/20%/15% | /Outside<br>/ F<br>/ PE<br>/ 25% | |
|---|---|---|---|---|
| #1  | PE /  | A1 A A1   | / PE  |  |
| #2A | B1+ / | A1 A A1   | / B1  | Blocking |
| #2B | B1+ / | A1 A A1   | / B1+ | Blocking |
| #3  | B2+ / | A1 A A1   | / B2+ | Slightly Lensing |
| #4  | B3+ / | A1 A A1   | / B3+ | Blocking & Severe Lensing |
|     | B3+ / | PE PE PE  | / B3+ |  |
|     | B2+ / | PE PE PE  | / B2+ |  |
| #5  | B6+ / | B4 B4 B4  | / B6+ | Slightly Blocking & Lensing |
| #6  | B1+ / | B5 B5 B5  | / B1+ | Blocking |
|     | PE /  | PE PE PE  | / PE  |  |

Figure 2:
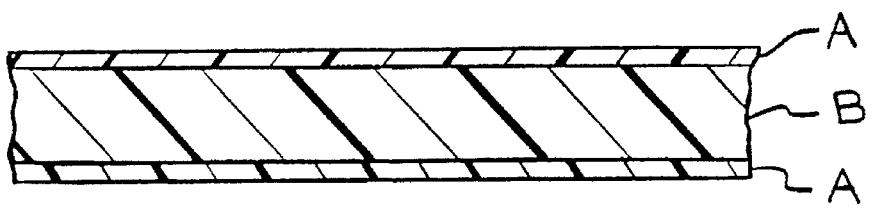
FIG. 2 is another embodiment of a multi-layer film structure of the present invention.
Figure 4:
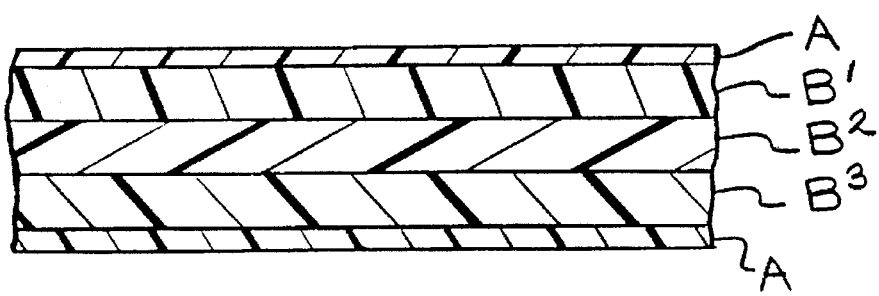
FIG. 4 is another embodiment of a multi-layer film structure of the present invention.

Resin Designations:
 A=Resin A (PVOH Resin)
 A1=100 Parts Resin A+15 parts Resin T
 B=Resin B (Acrylic Resin)
 B/OBA=Resin B with Original Blending Agent
 B/A61 =Resin B with New Blending Agent A61
 B/A62 =Resin B with New Blending Agent A62
 B/10T—Resin B Modified with 10% Resin T
 B/20T=Resin B Modified with 20% Resin T
 B1=100 parts B/20T, 15 parts T, 1 part G, 2 parts ST
 B2=100 parts B/A61, 43 parts T, 1 part G, 2 parts ST
 B3=100 parts B/OBA, 43 parts T, 1 part G, 2 parts ST
 B4=100 parts B/A62, 43 parts T
 B5=100 parts B/10T, 30 parts T
 B6=100 parts B/A61,43 parts T
 B1+=100 parts B/20T, 15 parts T, 1 part G, 2 parts ST, 5 parts S
 B2+=100 parts B/A61,43 parts T, 1 part G, 2 parts ST, 5 parts S
 B3+=100 parts B/OBA, 43 parts T, 1 part G, 2 parts ST, 5 parts S
 B6+=100 parts B/A62, 43 parts T, 1 part G, 2 parts ST, 5 parts S
 G=Green Color Concentrate (65% Green)
 S=Slip/Anti-block Concentrate (5% Slip & 20% AB)
 ST=Slip Concentrate (10% Slip in Resin T)
 T=Resin T (Blending Agent)—Tone™ Polymer P-787
 PE=Low Density Polyethylene In one embodiment of the present invention, a two-layer structure having a base or core layer B comprising the water soluble resin and a skin or outer layer A comprising the alkaline soluble resin can be formed as seen in FIG. 1. The two layers, A and B, are in contact with each other and in preferred embodiments are bonded or laminated together. Alternatively, a multi-layer structure having at least three layers, as shown in FIG. 2, can be produced, wherein the base or core layer B has the skin or outer layers A on both sides. FIG. 2 shows a cross-section of a multi layer film-having alkaline soluble layers B adjacent a water soluble layer A. It is to be understood that the film structure shown in both FIGS. 1 and 2 can either be coextruded structures or alternatively can comprise a water soluble layer coated with the alkaline soluble layer. Other multi-layer structures having more than one core layer can be produced. For example, FIG. 4 shows a five-layer structure having outer layers A and three core layers $B^1$, $B^2$ and $B^3$. The core layers can comprise the same or different resin materials.

The alkaline soluble layer and/or layers preferably comprise about 20 to about 60 percent of the total thickness of the film. The film in the present invention in embodiments where there are two or more alkaline soluble layers, it is preferred that each layer ranges from about 15 to about 30 percent of the thickness based on the total thickness of the film. The most preferred thickness of each alkaline soluble layer ranges from about 20 to about 30 percent and certain embodiments are preferred to be about 25 percent.

The water soluble layer and/or layers preferably comprise about 50 to about 70 percent, by weight, and the alkaline soluble layers preferably comprise about 30 to about 50 percent, by weight, of the composition based on the weight of the article.

One preferred process for producing the two-layer film of FIG. 1 and the three-layer film of FIG. 2 is using a coextrusion process, wherein the film is produced by a blown film or cast film process. The cast extruded films can be embossed by any suitable means, as described above.

Yet another process for making the present invention involves solution coating one or both sides of a water soluble base film with an alkaline soluble coating solution.

Figure 3:
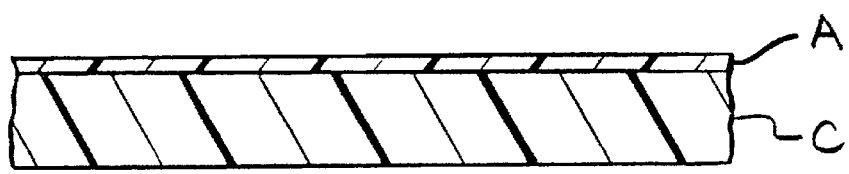
FIG. 3 is another embodiment of a multi-layer film structure of the present invention.

Still another embodiment of the present invention is a two-layer structure, as shown in FIG. 3, wherein layer C is a water soluble nonwoven fabric material and layer A comprises an alkaline soluble film or coating layer. The-layer. A can be applied by an extrusion coating process or by a lamination process.

From the description contained herein, it is clear that the degradable compositions of the present invention provide a unique combination of characteristics previously not obtained in disposable films and articles so that they possess long-term shelf and product life under dry or aqueous conditions and rapid degradation under alcohol-exposure conditions.

While the present invention has been described primarily in context of films, it is recognized that the present invention may also be practiced to advantage in many other applications and environments. It will be obvious to those skilled in the art that various changes and modifications can be made without departing from the spirit and scope of the invention, and it is intended to cover in the independent claims, all such modifications within the scope of this invention.

We claim:

1. An alkaline-soluble thermoplastic composition comprising a blend of at least one alkaline soluble polymer present at about 60 to about 90%, by weight, and a property modifier comprising polycaprolactone, present at about 30 to about 40%, by weight, based on the weight of the alkaline soluble thermoplastic composition wherein the alkaline soluble polymer comprises about 45 to about 65%, by weight, an ethyl acrylate/methacrylic acid copolymer; about 25 to 30%, by weight, of an ethyl acrylate/acrylate acid/styrene-modified terpolymer; about 5 to about 10%, by weight, of a blending agent suitable to blend the ethyl acrylate/methacrylic acid copolymer with the ethyl acrylate/acrylate acid/styrene modified terpolymer; and, optionally, about 0.5 to about 2.5 anti-block additive.

* * * * *

UNITED STATES PATENT AND TRADEMARK OFFICE
CERTIFICATE OF CORRECTION

PATENT NO. : 5,665,824
DATED : September 9, 1997
INVENTOR(S) : Peter I. Chang et al.

It is certified that error appears in the above-identified patent and that said Letters Patent is hereby corrected as shown below:

Col. 2, line 37, delete the hyphen between the words "and" and "weak".

Col. 4, line 2, delete the comma after the word "mold".

Col. 4, line 3, delete the comma after the word "material".

Col. 5, line 6, delete the "Weight" and insert the word -- weight --.

Col. 7, line 40, insert commas before "by" and after "weight".

Col. 7, line 42, insert a comma after the word "weight".

Col. 7, lines 43 and 44, after the word "terpolymer" delete the language "(commercially known as GBC2600 flake)" and insert the language -- (commercially known as GBC 2518 bead) --.

Col. 7, line 60, add an apostrophe between the letters "l" and "s" in the word "Shells".

UNITED STATES PATENT AND TRADEMARK OFFICE
CERTIFICATE OF CORRECTION

PATENT NO. : 5,665,824
DATED : September 9, 1997
INVENTOR(S) : Peter I. Chang et al.

It is certified that error appears in the above-identified patent and that said Letters Patent is hereby corrected as shown below:

Col. 12, line 15, delete the comma after the word "weeks" and insert a period after the word "weeks".

Col. 14, line 65, insert a hyphen between the words "multi" and "layer".

Col. 14, line 65, delete the hyphen after the word "film".

Col. 15, line 33, delete the hyphen after the word "The".

Col. 16, line 1, delete the period after the word "layer".

Signed and Sealed this

Twenty-third Day of December, 1997

Attest:

BRUCE LEHMAN

Attesting Officer

Commissioner of Patents and Trademarks